(12) United States Patent
Swamidas

(10) Patent No.: US 7,916,174 B2
(45) Date of Patent: Mar. 29, 2011

(54) SYSTEM AND METHOD FOR REMOTELY CONTROLLING A CAMERA

(75) Inventor: Peter J. Swamidas, Irving, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 421 days.

(21) Appl. No.: 11/958,454

(22) Filed: Dec. 18, 2007

(65) Prior Publication Data

US 2009/0158364 A1 Jun. 18, 2009

(51) Int. Cl.
*H04N 5/225* (2006.01)
*H04M 11/04* (2006.01)

(52) U.S. Cl. .................. 348/207.2; 348/143; 379/45

(58) Field of Classification Search ........... 348/207.2; 379/37, 45, 49, 88.13
See application file for complete search history.

(56) References Cited

U.S. PATENT DOCUMENTS

| | | | | |
|---|---|---|---|---|
| 6,633,609 B1* | 10/2003 | Ing et al. | ................ | 375/240.03 |
| 6,748,052 B2* | 6/2004 | Zellner et al. | ................ | 379/37 |
| 6,748,223 B2* | 6/2004 | Fraccaroli | ................ | 455/456.1 |
| 6,807,564 B1* | 10/2004 | Zellner et al. | ................ | 379/37 |
| 6,970,183 B1* | 11/2005 | Monroe | ................ | 348/143 |
| 7,058,409 B2* | 6/2006 | Hanninen et al. | ................ | 348/207.1 |
| 7,221,520 B2* | 5/2007 | Dowling et al. | ................ | 359/698 |
| 7,302,481 B1* | 11/2007 | Wilson | ................ | 709/224 |
| 7,424,282 B2* | 9/2008 | Barbeau | ................ | 348/211.1 |
| 7,428,002 B2* | 9/2008 | Monroe | ................ | 348/143 |
| 7,433,672 B2* | 10/2008 | Wood | ................ | 455/404.1 |
| 7,529,351 B2* | 5/2009 | Binning | ................ | 379/45 |
| 7,646,854 B2* | 1/2010 | Anderson | ................ | 379/37 |
| 2002/0118797 A1* | 8/2002 | Masuda | ................ | 379/37 |
| 2003/0038878 A1* | 2/2003 | Lee et al. | ................ | 348/143 |
| 2003/0085989 A1* | 5/2003 | Tay | ................ | 348/14.02 |
| 2003/0137422 A1* | 7/2003 | Nishibori | ................ | 340/573.1 |
| 2003/0202101 A1* | 10/2003 | Monroe et al. | ................ | 348/156 |
| 2004/0155969 A1* | 8/2004 | Hayashi | ................ | 348/207.99 |
| 2004/0201473 A1* | 10/2004 | Lee | ................ | 348/143 |
| 2005/0134691 A1* | 6/2005 | Cox | ................ | 348/207.99 |
| 2008/0260111 A1* | 10/2008 | Takeda et al. | ................ | 379/45 |
| 2008/0288628 A1* | 11/2008 | Starr et al. | ................ | 709/224 |

* cited by examiner

*Primary Examiner* — John M Villecco

(57) ABSTRACT

A system and method for remotely controlling a camera may include a telephony device communicatively coupled to a data network. The telephony device comprises at least one module adapted to generate a control signal in response to receiving a user command associated with dialing of an emergency telephone number. A camera may be adapted to start capturing images in response of receiving the control signal.

10 Claims, 3 Drawing Sheets

US 7,916,174 B2

SYSTEM AND METHOD FOR REMOTELY CONTROLLING A CAMERA

BACKGROUND INFORMATION

Various cameras may be connected to a network and used as surveillance cameras. For example, surveillance cameras have been implemented in areas such as homes, offices, banks, casinos, airports and convenience stores. Sometimes, surveillance cameras may be monitored, that is, a person may be assigned to watch images captured by the surveillance cameras in real time as the images are captured by the cameras. Also, images from surveillance cameras may be recorded in long term storage media (e.g., video tapes). Typically, there is no event worth monitoring and/or recording. As a result, resources (e.g., human, video tapes) are often wasted.

Recently, some cameras have been equipped with motion sensors thereby enabling the cameras to capture images when triggered by motion. However, normal movement by any object in the view of motion sensor may trigger the camera. Thus, the motion sensor technology does not completely solve the deficiency of wasted resources. There is a need for activating (e.g., starting) a surveillance camera and monitoring the images from the surveillance camera only when an emergency occurs.

BRIEF DESCRIPTION OF THE DRAWINGS

In order to facilitate a fuller understanding of the exemplary embodiments, reference is now made to the appended drawings. These drawings should not be construed as limiting, but are intended to be exemplary only.

DETAILED DESCRIPTION OF EMBODIMENTS

The description below describes servers, telephony devices, and network elements that may include one or more modules, some of which are explicitly shown, others are not. As used herein, the term "module" may be understood to refer to computing software, firmware, hardware, and/or various combinations thereof. It is noted that the modules are exemplary. The modules may be combined, integrated, separated, and/or duplicated to support various applications. Also, a function described herein as being performed at a particular module may be performed at one or more other modules and/or by one or more other devices instead of or in addition to the function performed at the particular module. Further, the modules may be implemented across multiple devices and/or other components local or remote to one another. Additionally, the modules may be moved from one device and added to another device, and/or may be included in both devices.

It is further noted that the software described herein may be tangibly embodied in one or more physical media, such as, but not limited to, a compact disc (CD), a digital versatile disc (DVD), a floppy disk, a hard drive, read only memory (ROM), random access memory (RAM), as well as other physical media capable of storing software, and/or combinations thereof. Moreover, the figures illustrate various components (e.g., servers, network elements, telephony devices, etc.) separately. The functions described as being performed at various components may be performed at other components, and the various components may be combined and/or separated. Other modifications also may be made.

Figure 1:
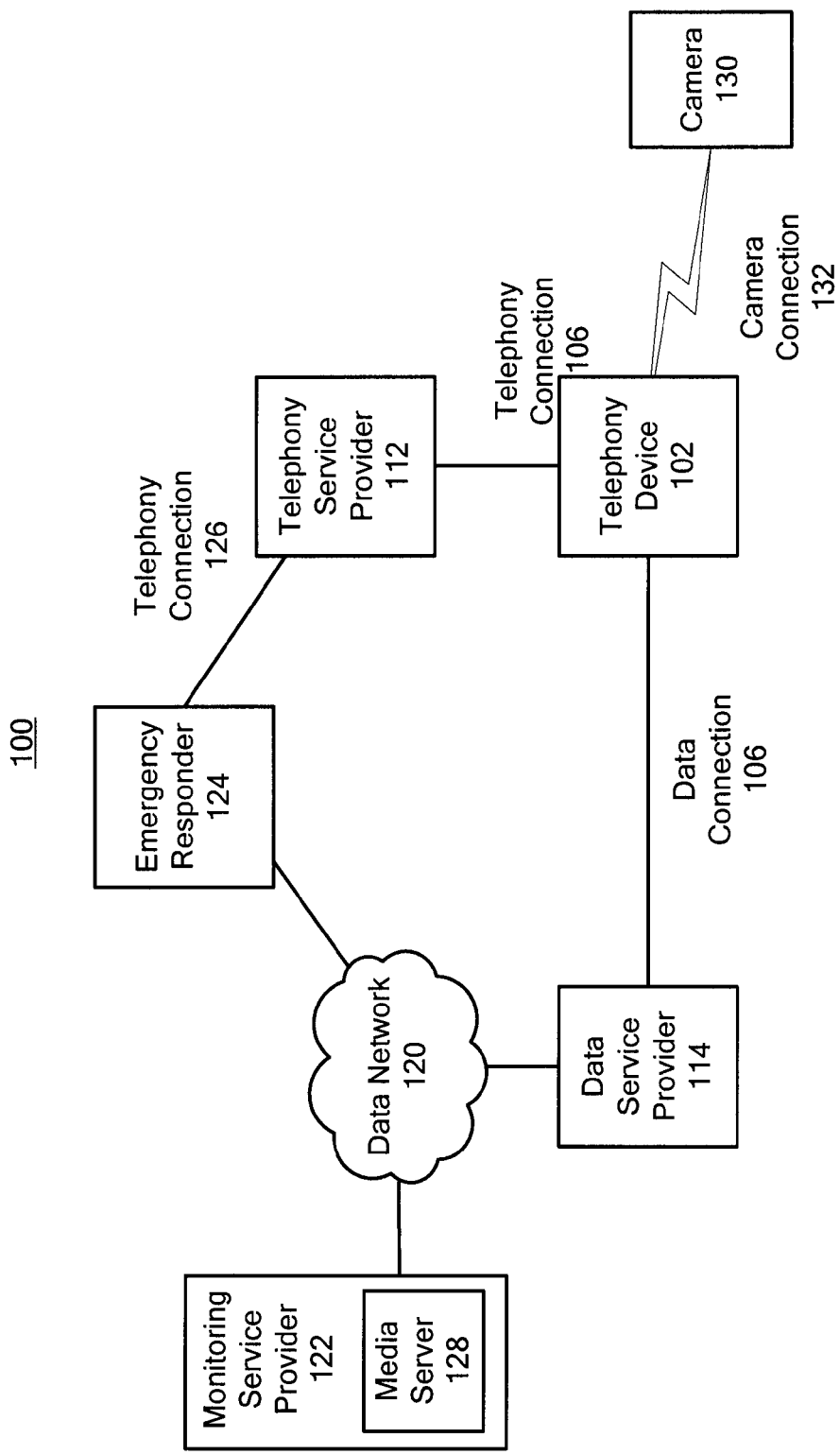
FIG. 1 depicts a schematic diagram of a system architecture according to an exemplary embodiment.

FIG. 1 depicts a schematic diagram of a system architecture, according to an exemplary embodiment. The exemplary system 100 is provided by way of example, as there are a variety of architectures and components capable of carrying out the methods disclosed herein. As shown, the system 100 may comprise a telephony device 102, a telephony service provider 112, a telephony connection 106, a data service provider 114, a data connection 108, an emergency responder 124, a telephony connection 126, a monitoring service provider 122, a media server 128, a camera 130 and a camera connection 132. It is noted that system 100 illustrates a simplified view of various components included in a system for controlling a networked camera, and that other hardware devices and software not depicted may be included in the system 100. It is also noted that the system 100 illustrates only a single instance of each component. It will be appreciated that multiple instances of these components may be used.

The telephony device 102 may be a device capable of being used as a telephone to make telephone calls. The telephony device 102 may be communicatively coupled to the telephony service provider 112 via the telephony connection 106. The telephony service provider 112 may be communicatively coupled to the emergency responder 124 (e.g., police, fire department, medical, crime hotline, security company) by the telephony connection 126. Thus, the telephony device 102 may establish a telephone session by dialing an emergency telephone number of the emergency responder 124. The emergency telephone number may be, for example, 911, #77, local police, state police, fire department, etc. The telephony connection 106 may be a wired connection, a wireless connection, or a combination of wired and wireless connections. In one exemplary embodiment, the telephony connection 106 may be a conventional land-based telephony connection (e.g., Public Switched Telephone Network). The telephony device 102 may be adapted to make telephone calls through the conventional land-based telephony connection. In another exemplary embodiment, the telephony connection 106 may be a packet-based network (e.g., ethernet, TCP/IP network). The telephony device 102 may be adapted to make telephone calls through the packet-based network (e.g., Voice-Over-IP (VOIP) phone). In one or more exemplary embodiments, the telephony device 102 may be a computer adapted to make telephone calls (e.g., a desktop computer, a laptop computer).

Figure 2:
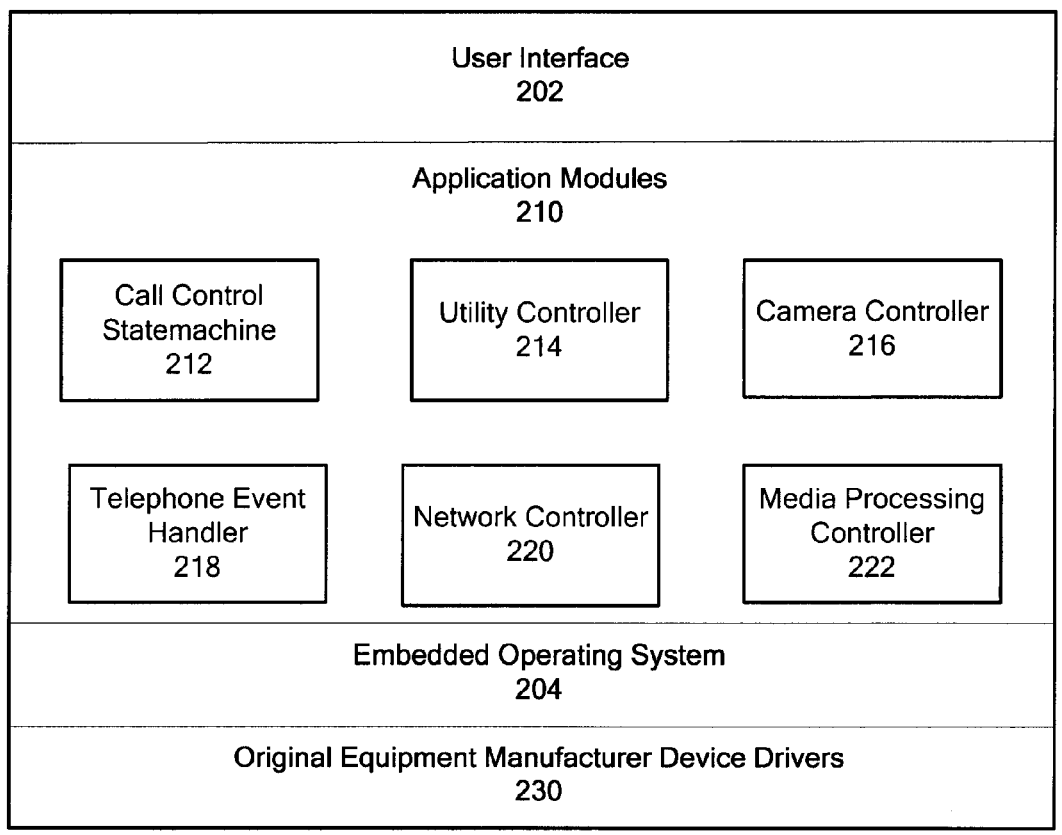
FIG. 2 depicts a block diagram of a telephony device according to an exemplary embodiment.

In addition, the telephony device 102 may be communicatively coupled to the data service provider 114 via the data connection 108. That is, the telephony device 102 may be used as a data communication device to communicate data through the data service provider 114 (e.g., a broadband data service provider). For example, the telephony device 102 may be capable of communicating data packets via a data connection 108. That is, the telephony device 102 may have an integrated component to handle data packets, such as, but not limited to, data packets based on ethernet protocols, or Internet Protocol (IP). In an exemplary embodiment, the telephony device 102 may implement a plurality of modules as shown in FIG. 2. One or more modules of the plurality of modules may handle data packets as needed. The data connection 108 may be wired (e.g., unshielded twisted pair, optic fiber), wireless (e.g., IEEE 802.11 network, bluetooth connection), or a combination of wired and wireless connections.

The data service provider 114 may provide a data gateway service for the telephony device 102. That is, through the data service provider 114, the telephony device 102 may be communicatively coupled to the data network 120. The data network 120 may be, for example, a packet switched network (e.g., Internet, or World Wide Web), or any data network that is capable of transmitting multimedia information (e.g., a surveillance network used by authorities to monitor cameras at remote locations). The multimedia information may be, for example, images, or audio signals, and may be transmitted in analog or digitized format. The data network 120 may be a wired network, a wireless network, or a combination of wired and wireless networks. In one embodiment, a wired connection may include long-range optical data communications, local area network based protocols, wide area networks, and/or other similar applications. In another embodiment, a wireless connection may include long-range wireless radio, local area wireless network such as 802.11 based protocols, wireless wide area network such as WiMax, infrared, bluetooth, and/or other similar applications. Other networks may also be utilized for connecting each of the various devices, systems and/or servers. Furthermore, data and/or multimedia content may be transmitted via cable, FiOS, satellite, or other forms of signal transmission. The emergency responder 124 may also be communicatively coupled to the data network 120.

In one or more exemplary embodiments, the data service provider 114 may also be the telephony service provider 112. In these embodiments, the telephony connection 106 may be carried by the data connection 108. For example, the telephony device 102 may be a VOIP telephone and the telephony connection 106 may be a connection over the data connection 108 (e.g., a broad band Internet connection).

The camera 130 may be communicatively coupled to the telephony device 102 via the camera connection 132. In one exemplary embodiment, the camera 130 may be a digital camera. That is, images captured by the camera 130 may be digitalized for storage and/or transmission. In another exemplary embodiment, the camera 130 may be a non-digital camera. That is, images captured by the camera 130 may be stored and/or transmitted in analog format. In one or more exemplary embodiments, the camera 130 may be capable of capturing images continuously (e.g., streaming video). In other exemplary embodiments, the camera 130 may be capture images by snap shots (e.g., one shot at a time). The camera connection 132 may be wired (e.g., unshielded twisted pair, Universal Serial Bus (USB) cable, IEEE 1394 FireWire), wireless (e.g., IEEE 802.11 network, bluetooth network), or a combination of wired and wireless connection. In one exemplary embodiment, the camera 130 may be an Internet Protocol (IP) camera and may be communicatively coupled to the telephony device 102 by a packet-based connection (e.g., ethernet, or wireless ethernet).

The camera 130 may be adapted to be activated (e.g., start capturing images) by a control signal from the telephony device 102. In one exemplary embodiment, an activation control signal may remotely turn on the camera 130 and start the camera. In another exemplary embodiment, the camera 130 may have a sleep mode. That is, the camera 130 may have an operational mode in which the camera 130 is powered on but does not capture any images, In this case, the activation control signal may activate the camera 130 to start capturing images. For example, the camera 130 may be connected to a home telephone (e.g., telephony device 102), via the camera connection 132, and the camera 130 may be turned off or in the sleep mode. If an emergency situation occurs, the user may use the telephony device 102 to contact the emergency responder 124. For example, the telephony device 102 may receive a user command associated with the dialing of an emergency telephone number, such as 911. In response to the user command, the telephony device 102 may generate a control signal and transmit the control signal to the camera 130 via the camera connection 132. The control signal may activate the camera 130 and the camera 130 may start capturing images. In one exemplary embodiment, the user command of dialing 911 may be a user pushing buttons for the digits 9-1-1. In another exemplary embodiment, the user command may be the user pushing a speed-dial button to dial a pre-stored telephone number 911. In yet another exemplary embodiment, the user command may be a voice command causing the telephony device 102 to dial the emergency telephone number.

Further, the camera 130 may be adapted to send captured images to the telephony device 102 in real time (e.g., as quickly as possible). For example, once activated, the camera 130 may establish a communication session with the telephony device 102. Through the communication session, the camera 130 may send captured images to the telephony device 102 as soon as they are captured.

In one exemplary embodiment, the telephony device 102 may be registered to the monitoring service provider 122. The monitoring service provider 122 may host the media server 128, which may be communicatively coupled to the data network 120. Upon receiving a user command associated with the dialing of an emergency telephone number, the telephony device 102 may establish a communication session with the media server 128 in addition to activating the camera 130. The telephony device 102 may transmit the received images from the camera 130 to the media server 128 as soon as they are received. Access to the media server 128 via the data network 120 may be provided to the emergency responder 124. Therefore, the telephony device 102 may relay the captured images from the camera 130 to the monitoring service provider 122 (e.g., the media server 128) in real time. Thus, the emergency responder 124 or the monitoring service provider 122 may watch the images as they are being captured with little delay (e.g., network latency). And the emergency responder 124 may establish a communication session with the monitoring service provider 122 (e.g., the media server 128) to watch the images live through the data network 120. The media server 128 may be, for example, a computer server, or other hardware components capable of broadcasting images.

In one or more exemplary embodiments, communications between the emergency responder 124 and the monitoring service provider 122, and between the monitoring service provider 122 and the telephony device 102 may be encrypted. Controlling access to a networked server and encryption of the network communication are well known in the art.

In one or more exemplary embodiments, the media server 128 may be hosted by the emergency responder 124. The telephony device 102 may establish a communication session with the media server 128 of the emergency responder 124 and transmit images from the camera 130 directly to the media server 128 of the emergency responder 124 through the data service provider 114. In these exemplary embodiments, the monitoring service provider 122 may not be necessary. The communication between the emergency responder 124 and the telephony device 102 may be encrypted.

In another exemplary embodiment, the media server 128 may be set up by the data service provider 114. The telephony device 102 may establish a communication session with the media server 128 and transmit images from the camera 130 to the media server 128 at data service provider 114. Access to the media server 128 over the network 120 may be given to the emergency responder 124. Therefore, the telephony device 102 may relay the captured images from the camera 130 to the media server 128 of data service provider 114 in real time.

The emergency responder 124 may establish a communication session with the data service provider 114 to receive the images transmitted in real time through the data network 120. Similarly, the communication between the emergency responder 124 and the data service provider 114, and between the data service provider 114 and the telephony device 102 may be encrypted.

In one or more exemplary embodiments, the telephony device 102 may establish a communication session with the media server 128 and/or transmitting images from the camera 130 to the data network 120 only in response to receiving the user command of dialing the emergency telephone number. Therefore, network resources may be preserved before the camera 130 is activated.

Also, in one or more exemplary embodiments, the camera 130 may also be capable of capturing audio signals in addition to images. In these exemplary embodiments, audio signals may be captured by the camera 130 concurrently with images and transmitted concurrently with the images.

Further, in one or more exemplary embodiments, telephony device 102 may only transmit partial data. For example, the camera 130 may be capable of capturing images continuously with 24 frames per second. All images may be stored transmitted to the telephony device 102. However, the media processing controller 222 may be adapted to transmit only 4 frames per second to the media server 128. Therefore, less bandwidth may be used and a lower-bandwidth connection to a media server 128 may be suffice. It should be noted that this capability may be implemented on the camera 130. That is, the camera 130 may only transmit partial data to the telephony device 102.

Moreover, in one or more exemplary embodiments, the camera 130 may serve as the media server 128. In these embodiments, the camera 130 may be connected to the data network 120 via a wired, a wired connection, or a combination of wired and wireless connections. For example, the camera 130 may be an IP camera. The camera 130 may establish a TCP/IP socket communication session with the emergency responder 124 and transmit images to the emergency responder 124 through the TCP/IP socket connection. TCP/IP socket communication is well known in the art.

FIG. 2 depicts a block diagram of a telephony device 102 according to an exemplary embodiment. As shown in FIG. 2, the telephony device 102 may comprise an user interface 202, application modules 210, a embedded operating system 204 and original equipment manufacturer (OEM) device drivers 230. The user interface 202, application modules 210, embedded operating system 204 and OEM device drivers 230 may form a multi-layered architecture. It should be noted that the exemplary telephony device 102 is provided by way of example, as there are a variety of architectures and components capable of carrying out methods disclosed herein.

The user interface 202 may comprise one or more components to receive user inputs, for example, a keypad, a plurality of buttons, or voice commands. Also, the user interface 202 may comprise one or more components to display information to user (e.g., a Liquid Crystal Display (LCD)). In one exemplary embodiment, a LCD touch screen may be used to accept user inputs and display information to user. It should be appreciated that other suitable input/output devices and components may be used instead of the LCD touch screen.

The application modules 210 may comprise a plurality of modules, which may include a call control statemachine 212, a utility controller 214, a camera controller 216, a telephone event handler 218, a network controller 220 and a media processing controller 222. These modules may be software modules implemented in any suitable programming languages (e.g., C, C++, Java). The communication between these modules may be implemented in procedure calls as known in the art. Further, the application modules 210 may be on top of layers of the embedded operating system 204 and the OEM device driver 230. The embedded operating system 204 may be an embedded computer operating system (e.g., an embedded Linux operating system, or a Windows CE). The OEM device drivers 230 may be OEM device drivers for hardware such as, but not limited to, serial port, wireless (e.g., IEEE 802.11), Ethernet, USB, IEEE 1394 FireWire. The embedded computer operating system and OEM device drivers are well known in the art.

The utility controller 214 of the application modules 210 may be a module adapted to control peripheral devices connected to the telephony device 102. The utility controller 214 may work with a camera controller 216 to control a camera communicatively coupled to the telephony device 102. The camera controller 216 may be a module implemented to control the camera. The camera controller 216 may sote information about the camera. For example, information about the connection to the camera (e.g., IP connection, USB connection, serial port connection) may be maintained by the camera controller 216. Also, features of the camera may also be stored, such as, but not limited to, resolution of the camera, zooming capability. Further, status of the camera may be maintained, such as, but not limited to, connected by not activated, powered down, live transmission of media. In one exemplary embodiment, the camera controller 216 may communicate with a connected camera through the utility controller 214 for connections that are not based on TCP/IP protocols (e.g., serial connection, USB connection).

The network controller 220 may be a module implemented to control packet-based network communications. For example, the network controller may implement one or more stacks of TCP/IP for IP network communications. TCP/IP and network controller implemented for IP network communications are well known in the art. The camera controller 216 may use network controller 220 to communicate with a camera that may be connected by ethernet or wireless ethernet (e.g., IEEE 802.11).

The call control statemachine 212 may be a module implementing a statemachine. That is, the call control statemachine 212 may define a plurality of states (e.g., idle, dial tone, dialing, ringing, connected). The call control statemachine 212 may also define one or more triggering events to trigger the call control statemachine 212 to change from a current state to a second state. For example, picking up a handset or pushing a button may be a triggering event from idle to dial tone. Other triggering events may be defined to trigger the state change from dial tone to dialing, from dialing to connected, from connected to idle, from idle to ringing, ringing to connected and connected to idle.

The telephone event handler 218 may be a module implemented to provide triggering events to the call control statemachine 212. For example, when a user dials a telephone number by pushing a series of buttons on a keypad or a touch screen, the telephone event handler 218 may capture the telephone number being dialed by the user. The telephone event handler 218 may generate a triggering event and transmit the triggering event to the call control statemachine 212. The triggering event may comprise the telephone number being dialed. The call control statemachine 212 may change from the current state to another state (e.g., from idle to dialing).

The call control statemachine 212 may be adapted to communicate with the utility controller 214. Communications may be implemented as a procedure call like previously described. For example, a dialed telephone number may be an emergency telephone number of the emergency responder 124. After receiving a triggering event from the telephone event handler 218, the call control statemachine 212 may send a message about the emergency telephone number being dialed to the utility controller 214. The message may trigger the utility controller 214 to activate a camera communicatively coupled to the telephony device 102.

The utility controller 214 may communicate the request to the camera controller 216. The camera controller 216 may determine the state of the camera (e.g., in sleep mode or off). If the camera is connected via an IP connection, the camera controller 216 may send a command to activate the camera to the network controller 220. The network controller 220 may work with the embedded operating system 204 and an OEM device driver to activate the camera. If the camera is connected via a non-IP connection (e.g., serial, USB), the camera controller 216 may send a command to activate the camera to the utility controller 214. The utility controller 214 may work with the embedded operating system 204 and an OEM device driver to activate the camera.

The utility controller 214 may further establish a communication session with a data network. As previously described, the telephony device 102 may be connected via a data connection 108 to the data service provider 114. If the media server 128 (e.g., by data service provider 114, or by monitoring service provider 120) is available, the utility controller 214 may establish a communication session with the media server 128. In the previous example, the message about dialing the emergency telephone number may also trigger the utility controller 214 to work with network controller 220 to establish a communication session to the media server 128 over the data connection 108. In one exemplary embodiment, a TCP/IP socket connection with the media server 128 may be established by the network controller 220. TCP/IP socket connections are well known in the art.

After the camera 130 is activated to capture images, the camera controller 216 may request the camera 130 to transmit captured images. The media processing controller 222 may be a module implemented to process the received images. In one or more exemplary embodiments, the media processing controller 222 may be programmed to communicate with the media server 128. For example, the media processing controller 222 may establish a communication session with the media server 128 over the data connection 108, the media processing controller 222 may relay the received images to the media server 128. If the communication session has not been established, the media processing controller 222 may buffer (e.g., store temporarily) the images received and request the utility controller 214 to establish the communication session. In one or more exemplary embodiments, the media processing controller 222 may wait for the media server 128 to request the captured images before transmitting the images. In these exemplary embodiments, establishing a communication session between the telephony device 102 and the media server 128 may serve as a notification to the 128 that live images may be available. And the live images may be transmitted to the media server 128 upon request. For example, request and response of live images may be implemented in TCP/IP socket communication.

In one or more exemplary embodiments, the application modules 210 may define an application programming interface (API). The API may be a set of procedure calls that an OEM device driver may implement to enable a peripheral device to respond to control commands. For example, the telephony device 102 may define a set of procedure calls that a camera vendor may implement for the vendor's cameras to work with the telephony device 102. The procedure calls may determine how control signals (e.g., activation, zooming) are to be sent from the telephony device 102 to the camera 130 and how the camera 130 respond to the control signals.

Figure 3:
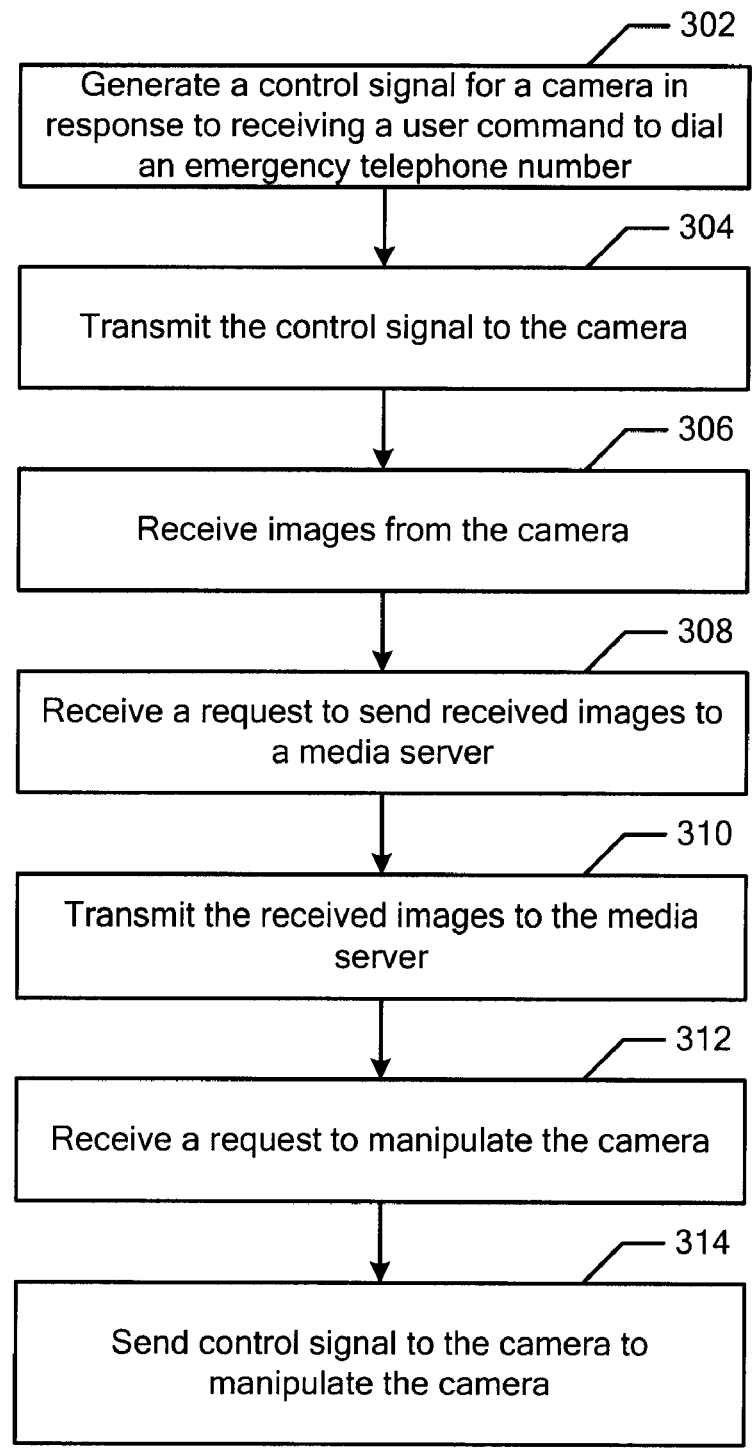
FIG. 3 depicts a flowchart of a method for controlling a camera using a telephony device according to an exemplary embodiment.

FIG. 3 depicts a flowchart of a method for controlling the camera 130 using the telephony device 102, according to an exemplary embodiment. The exemplary method 300 is provided by way of example, as there are a variety of ways to carry out methods disclosed herein. The method 300 shown in FIG. 3 may be executed or otherwise performed by one or a combination of various systems. The method 300 is described below as carried out by the system 100 shown in FIG. 1 and the telephony device 102 shown in FIG. 2 by way of example, and various elements of the telephony device 102 and system 100 are referenced in explaining the example method of FIG. 3. Each block shown in FIG. 3 represents one or more processes, methods, or subroutines carried in the exemplary method 300. A computer readable media comprising code to perform the acts of the method 300 may also be provided. Referring to FIG. 3, the exemplary method 300 may begin at block 302.

At block 302, a control signal to activate a camera may be generated in response to receiving a user command associated with the dialing of an emergency telephone number. For example, a telephony device 102 may receive a user command associated with the dialing of an emergency telephone number. In one exemplary embodiment, the telephony device 102 may have an LCD touch screen as described previously, and the user command may be a button push on the LCD screen. In response to the user command, a control signal may be generated by the telephony device 102. One exemplary embodiment was described with reference to FIG. 2. For example, the telephony event handler 218 may capture the dialed telephone number and trigger a state change in the call control statemachine 212. The call control statemachine 212 may cause the utility controller 214 to activate a communicatively coupled camera. The utility controller 214 may use the camera controller 216 to generate a control signal for the camera.

At block 304, the control signal may be transmitted to the camera. The control signal may activate a camera communicatively coupled to the telephony device 102 and may cause the camera to start capturing images. For example, the telephony device 102 may transmit the control signal to the camera 130 to activate the camera 130 and cause the camera 130 to start capturing images. The control signal may be transmitted over the camera connection 132, which may be a wired connection, a wireless connection, or a combination of wired and wireless connections as discussed above with reference to FIG. 1.

At block 306, images from the camera may be received. For example, the telephony device 102 may establish a communication session with the camera 130 after the camera 130 has been activated. Images captured by the camera 130 may be transmitted from the camera 130 to the telephony device 102 through the communication session.

At block 308, a request to transmit the received images to a media server may be received. For example, the telephony device 102 may establish a communication session with the media server 128. In one exemplary embodiment, the media server 128 may be maintained by a monitoring service provider 122. The media server 128 may send a request to the telephony device 102 to request images captured by the camera 130. The telephony device 102 may be connected to the media server 128 via the data connection 108 and the data network 120. The data connection 108 and the data network 120 have been described in detail with reference to FIG. 1.

At block 310, images may be transmitted to the media server. For example, through the communication session established between the telephony device 102 and the media server 128, the telephony device 102 may transmit the received images from the camera 130 to the media server 128. The emergency responder 124 may connect to the media server 128 and use a media player client to view the captured images in real time. In one exemplary embodiment, the emergency responder 124 may be connected to the media server 128 via a TCP/IP connection. The media player client used by the emergency responder 124 may be an Internet web browser. As described previously with reference to FIG. 1, access to the live images may be restricted, and the communication between the emergency responder 124 and the media server 128 may be encrypted.

At block 312, a request to manipulate the camera may be received. For example, the camera 130 may be remotely controlled. To facilitate capturing relevant images, the emergency responder 124 may send one or more requests to manipulate the camera 130, such as zooming, changing angles. The one or more requests may be sent to the media server 128. The media server 128 may then forward the one or more requests to the telephony device 102 through the communication session between the telephony device 102 and the media server 128.

At block 314, control signal manipulating the camera may be transmitted to the camera. For example, in response to the one or more requests to manipulate the camera 130, the telephony device 102 may generate one or more control signals to manipulate the camera 130 as requested. The one or more control signal may be generated and transmitted in accordance with the set of APIs between the telephony device 102 and the camera 130 as described previously with reference to FIG. 2.

While the embodiments described above may be directed to a telephony device and a camera to facilitate activating the camera in response to an emergency telephone call, it should be appreciated to one of ordinary skill in the art that a plurality of cameras may be connected to the telephony device and any one or combination of the plurality of cameras may be activated by the method and system described herein. Additionally, it should be appreciated that the camera may capture audio signals as well as images and audio signals may be transmitted relayed as well.

In the preceding specification, various embodiments have been described with reference to the accompanying drawings. It will, however, be evident that various modifications and changes may be made thereto, and additional embodiments may be implemented, without departing from the broader scope of the disclosure as set forth in the claims that follow. The specification and drawings are accordingly to be regarded in an illustrative rather than restrictive sense.

The invention claimed is:

1. A method, comprising:
    generating a control signal using a telephony device, for at least one camera, in response to receiving a user command associated with dialing of an emergency telephone number;
    transmitting the control signal to the at least one camera, wherein the control signal causes the at least one camera to start capturing images,
    receiving images from the at least one camera;
    receiving a request to transmit the images from the at least one camera to at least one media server;
    buffering the images prior to establishment of a data connection to transmit the images to the at least one media server;
    establishing, from the telephony device communicatively coupled to the at least one camera, the data connection to the at least one media server;
    transmitting the images from the at least one camera to the at least one media server via the data connection;
    receiving a request, at the telephony device from the at least one media server, to manipulate the camera;
    transmitting the request to manipulate the camera from the telephony device to the at least one camera; and
    manipulating the at least one camera in response to the request to manipulate the camera.

2. The method of claim 1, wherein the control signal is transmitted to the at least one camera via one of a wired connection, a wireless connection, and a combination thereof.

3. The method of claim 2, wherein the wired connection is one of a packet-based connection and a Universal Serial Bus (USB) connection.

4. The method of claim 3, wherein the wireless connection is one of an ethernet connection based on IEEE 802.11 protocol, and a connection based on bluetooth technology.

5. The method of claim 1, wherein the emergency telephone number is one of police, fire, ambulance, crime hotline, and security company.

6. The method of claim 1, wherein the control signal is generated by a telephony device.

7. The method of claim 1, wherein the control signal is generated by a VOIP telephony device.

8. The method of claim 1, further comprising:
    receiving a command to manipulate the at least one camera, wherein the command comprises at least one of zooming in, zooming out, rotating shooting angle, moving the camera vertically and moving the camera horizontally.

9. The method of claim 1, wherein the data connection to the at least one media server comprises a low bandwidth connection and transmitting the images from the at least one camera to the at least one media server via the data connection comprises transmitting a number of frames per second reduced from a number of frames per second captured.

10. A non-transitory computer readable media comprising code to perform the acts of the method of claim 1.

* * * * *